US010610883B2

(12) United States Patent
Ridge

(10) Patent No.: US 10,610,883 B2
(45) Date of Patent: Apr. 7, 2020

(54) HOT MELT ADHESIVE SYSTEM AND ASSOCIATED METHODS

(71) Applicant: NORDSON CORPORATION, Westlake, OH (US)

(72) Inventor: William M. Ridge, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 231 days.

(21) Appl. No.: 15/802,622

(22) Filed: Nov. 3, 2017

(65) Prior Publication Data

US 2018/0126410 A1      May 10, 2018

Related U.S. Application Data

(60) Provisional application No. 62/420,025, filed on Nov. 10, 2016.

(51) Int. Cl.
*B05C 11/10*     (2006.01)
*B29C 31/02*     (2006.01)
(Continued)

(52) U.S. Cl.
CPC ........ *B05C 11/1042* (2013.01); *B29B 13/022* (2013.01); *B29C 31/02* (2013.01);
(Continued)

(58) Field of Classification Search
CPC ..... B05C 11/1042; B05C 5/001; B65C 31/02; B65C 31/04; B65B 13/022; B29K 2105/0097
See application file for complete search history.

(56) References Cited

U.S. PATENT DOCUMENTS 9,308,547 B2 * 4/2016 Clark .................. B05C 11/1042
2015/0114989 A1    4/2015 Fort et al.
(Continued)

FOREIGN PATENT DOCUMENTS

WO        2014/172352 A1    10/2014

OTHER PUBLICATIONS

IPEA/409—International Preliminary Report on Patentability dated May 23, 2019 for WO Application No. PCT/US17/059837.
(Continued)

*Primary Examiner* — Timothy P. Kelly
(74) *Attorney, Agent, or Firm* — Baker & Hostetler LLP

(57) ABSTRACT

A method of supplying adhesive particulates from a supply container to an adhesive melter includes fluidly coupling an adhesive transfer structure between the adhesive melter and the supply container, lowering an internal surface temperature of the adhesive transfer structure by directing cooling air through the adhesive transfer structure, and moving the adhesive particulates from the supply container into the adhesive melter for melting the adhesive particulates into a fluid adhesive after lowering the internal surface temperature of the adhesive transfer structure. A hot melt adhesive system includes a supply container for storing adhesive particulate, an adhesive melter, an adhesive transfer structure coupled to the supply container and the adhesive melter for transferring cooling air and adhesive particulate toward the adhesive melter, and a control configured to transfer the cooling air through the adhesive transfer structure before the adhesive particulate is transferred toward the adhesive melter.

18 Claims, 4 Drawing Sheets

(51) Int. Cl.
 *B29B 13/02* (2006.01)
 *B29C 31/04* (2006.01)
 *B29K 105/00* (2006.01)
 *B05C 5/00* (2006.01)
(52) U.S. Cl.
 CPC .............. *B29C 31/04* (2013.01); *B05C 5/001* (2013.01); *B29K 2105/0097* (2013.01)

(56) References Cited

U.S. PATENT DOCUMENTS

2015/0158049 A1 6/2015 Clark et al.
2016/0236231 A1 8/2016 Chastine et al.

OTHER PUBLICATIONS

ISA/220—Notification of Transmittal or Search Report and Written Opinion of the ISA, or the Declaration dated Jul. 5, 2018 for WO Application No. PCT/US17/059837.

* cited by examiner

HOT MELT ADHESIVE SYSTEM AND ASSOCIATED METHODS

CROSS REFERENCE TO RELATED APPLICATIONS

This application claims the benefit of U.S. Provisional Patent App. No. 62/420,025, filed Nov. 10, 2016, the disclosure of which is hereby incorporated by reference herein.

TECHNICAL FIELD

The present invention relates generally to hot melt adhesive systems and, more specifically, those systems that heat and liquefy particulate hot melt adhesive.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of solid or semi-solid pellets or particulates. These hot melt adhesive particulates are melted into a liquid form by a melter, and the liquid hot melt adhesive is ultimately applied to an object such as a work piece, substrate or product by a dispensing device suitable to the application.

A supply of unmelted hot melt adhesive pieces (hereinafter "adhesive particulate") must be maintained and delivered to the melter in order for the melter to produce the liquid hot melt adhesive used by the dispensing device. For example, it is known for a person to employ a scoop or bucket to retrieve hot melt adhesive particulate from a bulk supply, and to deliver the particulate to a melter. Typically, this involves filling a hopper or other container associated with the melter one scoop of hot melt adhesive particulate at a time. This requires the person to handle the hot melt adhesive particulate closely, which may be undesirable because hot melt adhesive dust may be stirred up during handling. In addition, transferring hot melt adhesive particulate in this manner is prone to waste and other issues caused by spillage.

Other challenges relate to issues surrounding the propensity for particulates of hot melt adhesive to become stuck together under certain storage and use conditions. If particulates stick or agglomerate together, it becomes difficult to feed the particulate into a hopper and/or into an associated melter tank. Once the particulates are in the hopper associated with a melter tank, clumping and sticking of particulates can be caused by heat emanating from the melter tank. Therefore, improvements generally related to these and related areas of hot melt adhesive dispensing systems are desirable.

SUMMARY

In accordance with one embodiment, a method of supplying adhesive particulates from a supply container to an adhesive melter includes fluidly coupling an adhesive transfer structure between the adhesive melter and the supply container, lowering an internal surface temperature of the adhesive transfer structure by directing air from a pressurized air source through the adhesive transfer structure, and moving the adhesive particulates from the supply container into the adhesive melter using the air from the pressurized air source after lowering the internal surface temperature of the adhesive transfer structure.

In accordance with another embodiment, a hot melt adhesive system includes a supply container for storing adhesive particulate, an adhesive melter, an adhesive transfer structure, and a control. The adhesive transfer structure is coupled to the supply container and the adhesive melter for transferring cooling air and adhesive particulate toward the adhesive melter. The control is configured to transfer the cooling air through the adhesive transfer structure, and then using the cooling air to transfer the adhesive particulate toward the adhesive melter.

In accordance with another embodiment, a method of supplying adhesive particulates from a supply container to an adhesive melter includes fluidly coupling an adhesive transfer hose between the adhesive melter and the supply container, lowering an internal surface temperature of the adhesive transfer hose by directing air from a pressurized air source through the adhesive transfer hose, and moving the adhesive particulates from the supply container toward the adhesive melter through the adhesive transfer hose after lowering the internal surface temperature of the adhesive transfer hose.

In accordance with another embodiment, a hot melt adhesive system includes a supply container for storing adhesive particulate, an adhesive melter, and adhesive transfer hose, and a control. The adhesive transfer hose is coupled to the supply container and the adhesive melter for transferring cooling air and adhesive particulate toward the adhesive melter. The control is configured to transfer the cooling air through the adhesive transfer hose before transferring the adhesive particulate toward the adhesive melter through the adhesive transfer hose.

Various additional aspects and features of the invention will become more readily apparent to those of ordinary skill in the art upon review of the following detailed description of the illustrative embodiments.

DETAILED DESCRIPTION

Figure 1:
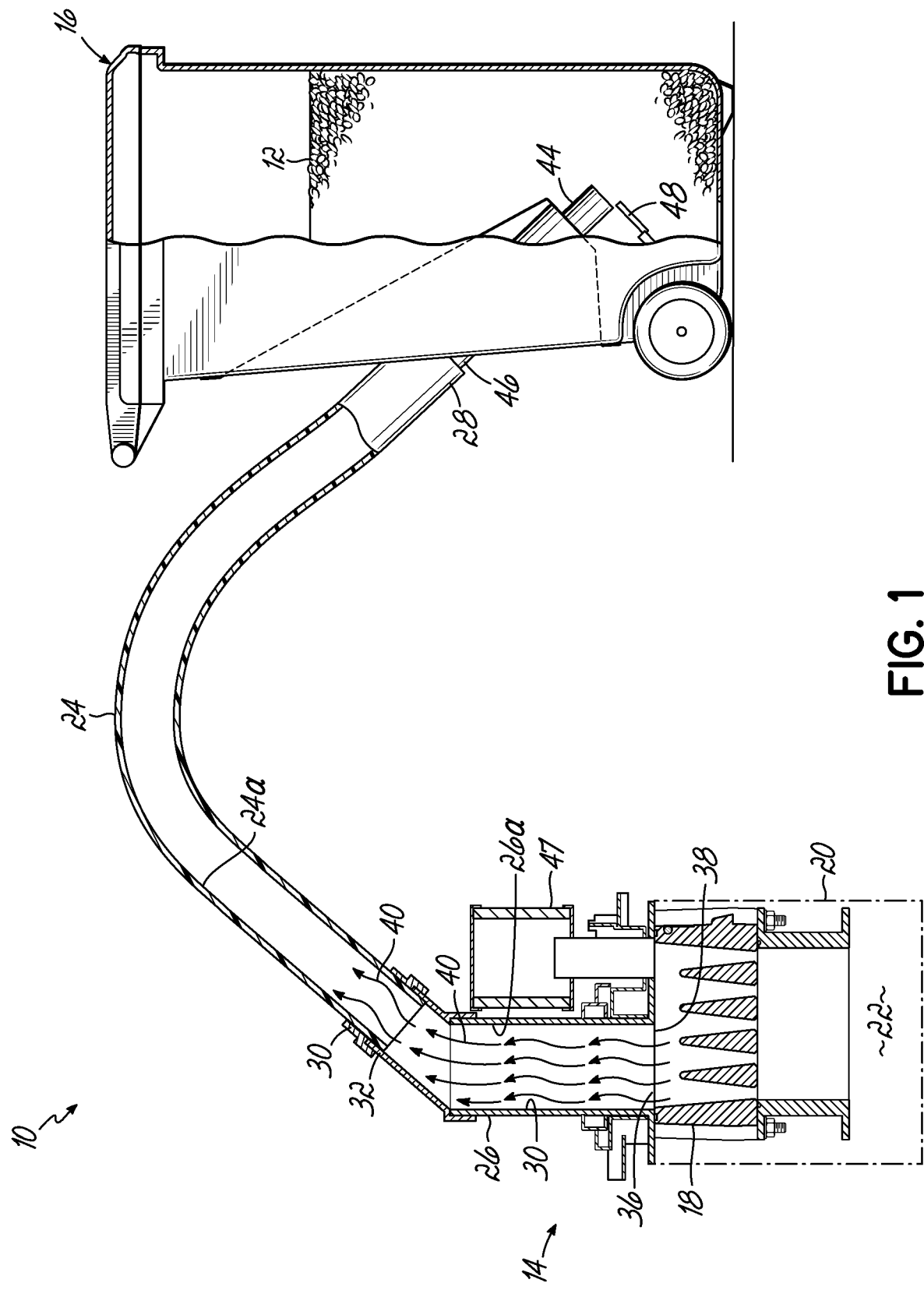
FIG. 1 is a perspective view of an adhesive melting system constructed in accordance with a first embodiment of the invention.

FIG. 1 illustrates an adhesive melting system 10 constructed in accordance with an illustrative embodiment of the invention. Adhesive melting system 10 is for melting adhesive particulates, such as pellets, chips, or other forms, into liquid adhesive. According to the illustrative embodiment, the adhesive particulates are adhesive pellets 12. As used herein, the term "adhesive pellets" is not intended to be limiting as to any specific shape or size, so long as the adhesive pellets are suitable to be carried by a stream of forced air such as a vacuum-driven stream. For example, and without limitation, adhesive pellets 12 may have regular shapes, irregular shapes, or any combination thereof. Moreover, any two pellets 12 may have distinct shapes and/or dimensions and still be jointly and generally referred to as "adhesive pellets."

With further reference to FIG. 1, adhesive melting system 10 includes an adhesive melter 14 and a supply container 16 containing adhesive pellets 12. Supply container 16 may be any appropriate shape and/or size for receiving and containing the adhesive particulates. Adhesive melter 14 includes a melting grid 18 within a tank 20. A space 22 in tank 20 below the melting grid 18 is for receiving liquefied hot melt adhesive. It will be appreciated that adhesive melter 14 may include a large or small tank, and/or may include a much smaller heating device with a chamber that receives a small amount of particulate hot melt adhesive for melt-on-demand purposes. The liquefied hot melt adhesive may then be directed to a suitable dispensing device or devices (not shown). Adhesive melting system 10 may also include a control (discussed below) for allowing an operator to control the various parameters and operational aspects of adhesive melting system 10.

Still referring to FIG. 1, adhesive melter 14 and supply container 16 are in fluid communication for moving adhesive pellets 12 from supply container 16 to adhesive melter 14. More specifically, adhesive melting system 10 includes an adhesive transfer structure. In the illustrative embodiment, the adhesive transfer structure includes a transfer hose 24 and an adhesive melter feed housing 26. Transfer hose 24 may be generally flexible, generally rigid, or formed from any combination thereof, so long as transfer hose 24 fluidly connects supply container 16 to adhesive melter feed housing 26. An inlet 28 of transfer hose 24 is in fluid communication with supply container 16, and an outlet 30 of transfer hose 24 is in fluid communication with an inlet 32 of adhesive melter feed housing 26. Feed housing 26 includes a chamber 34 for receiving adhesive pellets 12 or other particulate forms of hot melt adhesive. An outlet 36 of feed housing 26 communicates with an opening 38 of adhesive melter 14. Opening 38 is positioned above melting grid 18 in adhesive melter 14. The heat emanating from melting grid 18 rises through feed housing 26 and into transfer hose 24, as indicated by arrows 40. In one embodiment, when melting grid 18 is operated at about 350° F., the internal surface temperatures of feed housing 26 and/or transfer hose 24 may be about 150° F. When adhesive pellets 12 are in such elevated temperature conditions, the potential exists for adhesive pellets 12 to bond to each other and to adjacent surfaces because pellets 12 may become tacky. It will be appreciated that, in other embodiments, the adhesive transfer structure may include any other structure configured to allow the adhesive to be transferred to the adhesive melter 14.

Figure 2:
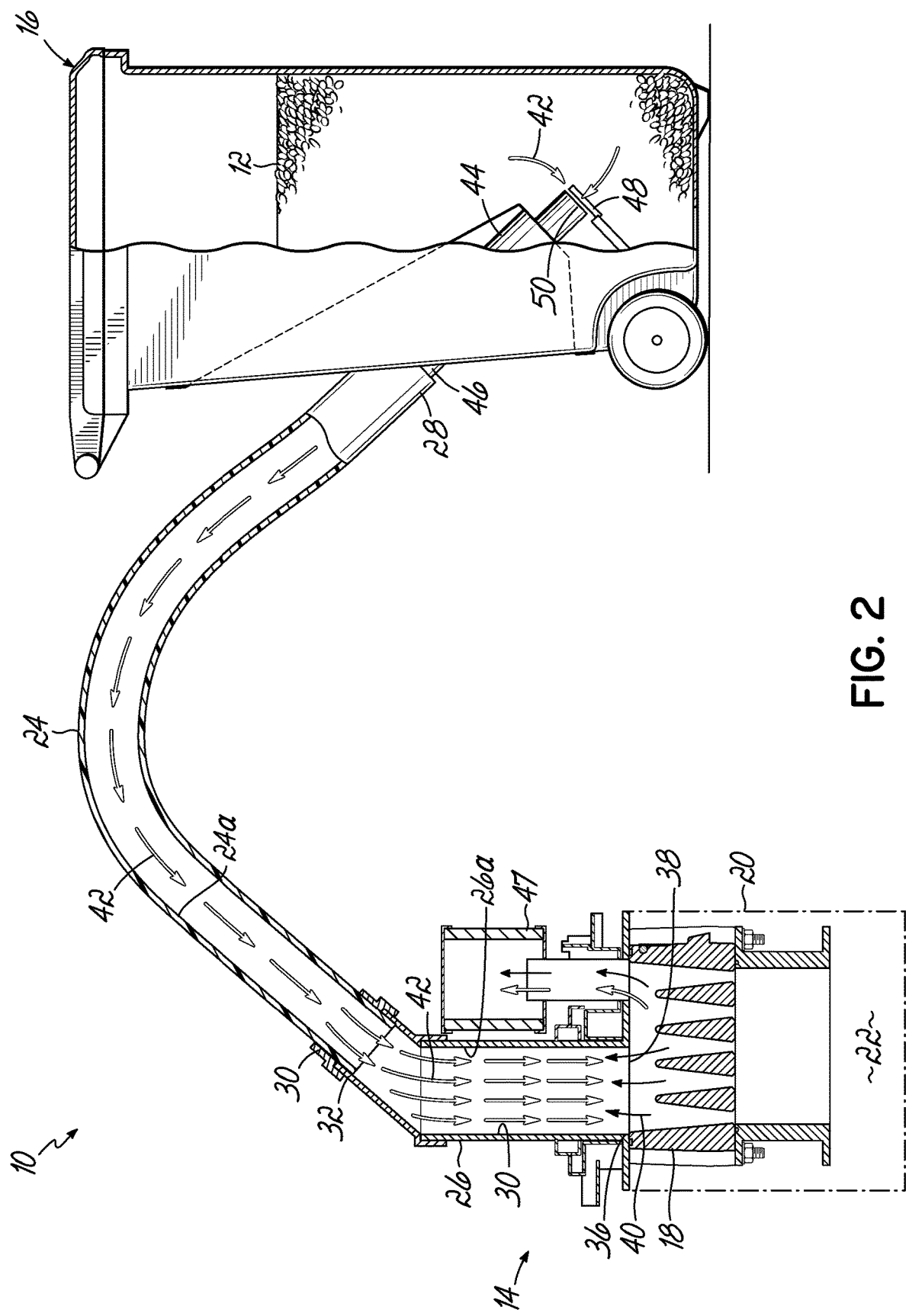
FIG. 2 is a perspective view of the adhesive melting system of FIG. 1 with cooling air flowing through a transfer hose.

With reference to FIG. 2, cooling air is directed through transfer hose 24 to lower the temperature of an inner surface 24a of transfer hose 24 and an inner surface 26a of feed housing 26 before adhesive pellets 12 are transferred to adhesive melter 14, as indicated by arrows 42. Lowering the temperature of the inner surfaces 24a, 26a of transfer hose 24 and feed housing 26 prior to the adhesive transfer process step reduces the tendency for adhesive pellets 12 to stick together, build-up, and potentially clog feed housing 26 and transfer hose 24. In other words, heat from adhesive melter 14 is less likely to cause adhesive pellets 12 to become sticky or tacky, or even melt before reaching the melting grid 18. In the illustrative embodiment, a suction wand 44 is connected to supply container 16. An outlet 46 of suction wand 44 is fluidly connected to the inlet 28 of the transfer hose 24 for suctioning air and adhesive pellets 12 out of supply container 16. In an embodiment, suction wand 44 may include a venturi pump (not shown) to act as a source of pressurized air. Forced air is supplied to the venturi pump for generating a vacuum in transfer hose 24. However, any pressure differential may be used with the air, or any other desirable gas, within adhesive melting system 10, to create a suction force or blowing force through transfer hose 24, i.e., pressurized air. Due to the vacuum, air from supply container 16 is drawn through transfer hose 24 and into adhesive melter 14. The air within supply container 16 has a lower temperature than the inner surfaces 24a, 26a of transfer hose 24 and adhesive melter feed housing 26. Therefore, the air moving through transfer hose 24 and adhesive melter feed housing 26 acts as a heat exchanger, i.e., cooling air, and lowers the temperature of the inner surfaces 24a, 26a. In one embodiment, the temperatures of inner surfaces 24a, 26a are lowered by about 40° F., for example, from 150° F. to 110° F. Adhesive melter 14 includes an exhaust conduit 47 to expel the forced air from tank 20.

With further reference to FIG. 2, an exemplary mechanism that selectively prevents adhesive pellets 12 from moving through transfer hose 24 is shown as a transfer gate 48. Transfer gate 48 is in a first, extended or closed position where transfer gate 48 is configured to block adhesive pellets 12 from entering an inlet 50 of suction wand 44. When transfer gate 48 is in the extended position, air is permitted to be drawn into transfer hose 24 and toward adhesive melter 14 (arrows 42). In alternative embodiments (not shown), transfer gate 48 or another mechanism to introduce air to transfer hose 24 may be positioned at various locations exterior to supply container 16. For example, transfer gate 48 may be positioned downstream of inlet 50 of suction wand 44. As used herein, the term "downstream" references the directional flow of adhesive particulate and air from the supply container 16 toward the adhesive melter 14. For example, adhesive melter 14 is downstream of transfer hose 24.

Figure 3:
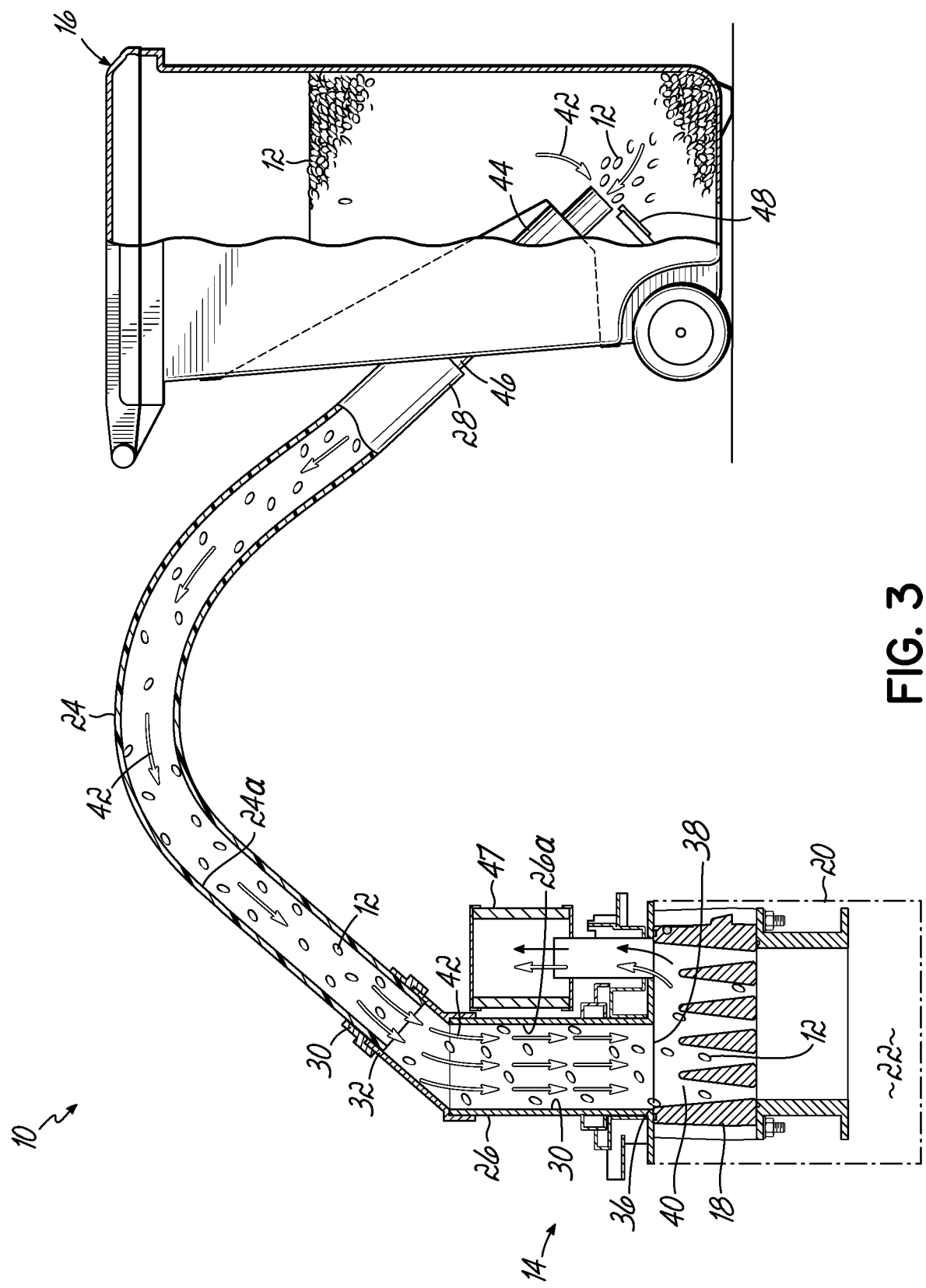
FIG. 3 is a perspective view of the adhesive melting system of FIG. 1 with particulate flowing through a transfer hose.

Referring to FIG. 3, after the temperatures of inner surfaces 24a, 26a of transfer hose 24 and feed housing 26 have been lowered, adhesive pellets 12 may be moved from supply container 16 to adhesive melter 14. In the illustrative embodiment, transfer gate 48 may be moved to a second, retracted or open position to allow adhesive pellets 12 to pass into inlet 50 of suction wand 44. The vacuum draws adhesive pellets 12 and air (arrows 42) from within supply container 16 and directs adhesive pellets 12 into adhesive melter 14. Adhesive pellets 12 move through transfer hose 24 into adhesive melter 14 via the pressurized air created by suction wand 44.

Figure 4A:
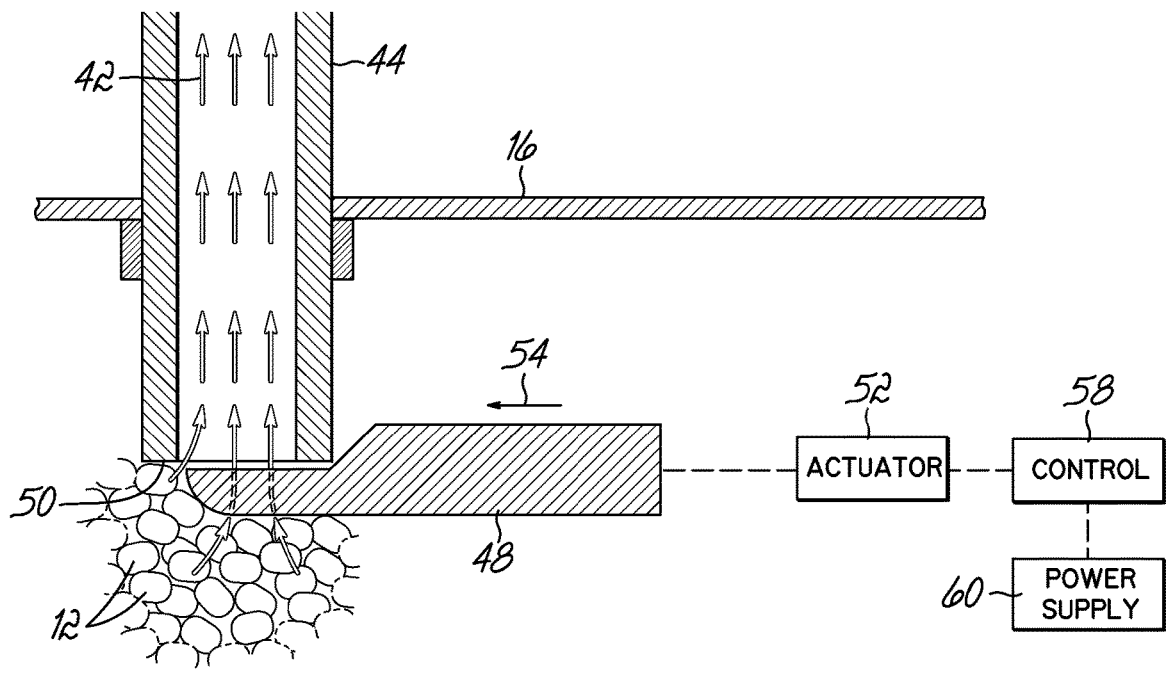
FIG. 4A is a cross-sectional schematic view of a transfer gate of the adhesive melting system of FIG. 1 showing the transfer gate in a first, extended position.
Figure 4B:
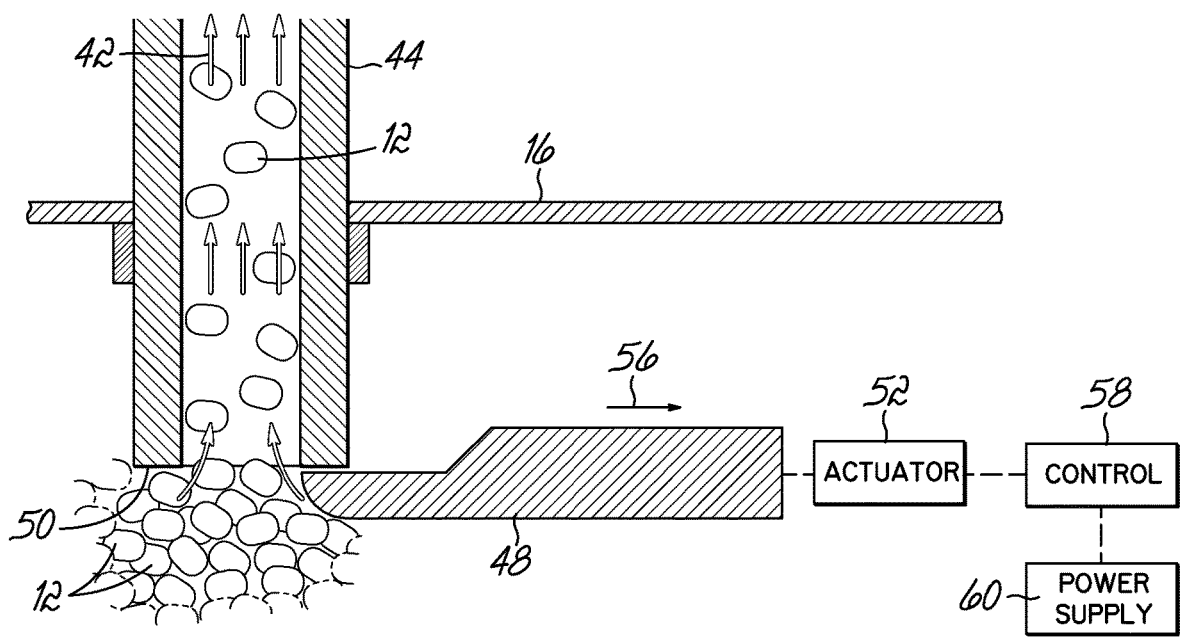
FIG. 4B is a cross-sectional schematic view of the transfer gate of FIG. 4A showing the transfer gate in a second, retracted position.

With reference to FIGS. 4A and 4B, the exemplary mechanism that selectively prevents adhesive pellets 12 from moving through transfer hose 24 is shown in more detail. In FIG. 4A, transfer gate 48 is shown in the first, extended or closed position in which pellets 12 are blocked but air is permitted to enter inlet 50 of suction wand 44. To that end, transfer gate 48 is spaced apart from inlet 50 to allow air to enter inlet 50 while preventing adhesive pellets 12 from passing. In FIG. 4B, transfer gate 48 is shown in the second, retracted or open position in which air and adhesive pellets 12 are allowed to pass through inlet 50. FIGS. 4A and 4B, also schematically depict an actuator 52 that may be configured to extend transfer gate 48 towards inlet 50 and to retract transfer gate 48 away from inlet 50, as indicated by arrows 54, 56, respectively. Actuator 52 may be controlled by any suitable control device 58 and powered by any suitable power supply 60. The control device 58 may be in communication with a sensor (not shown) that measures the level of the melted adhesive in the tank 20. The control device 58 may be configured to determine when the fill system will need to deliver adhesive based on feedback from the sensor and to begin the transferring cooling air through the transfer hose 24 before the adhesive transfer process step.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method of supplying adhesive particulates from a supply container to an adhesive melter, the method comprising:
   fluidly coupling an adhesive transfer structure between the adhesive melter and the supply container;
   lowering an internal surface temperature of the adhesive transfer structure by directing cooling air from a pressurized air source through the adhesive transfer structure to the adhesive melter; and
   moving the adhesive particulates from the supply container into the adhesive melter using the cooling air from the pressurized air source after lowering the internal surface temperature of the adhesive transfer structure.

2. The method of claim 1, wherein the adhesive transfer structure includes an adhesive melter feed housing, the method further comprising:
   fluidly coupling the adhesive melter feed housing between the adhesive melter and the supply container,
   wherein moving the adhesive particulates includes supplying the cooling air through the adhesive melter feed housing and lowering the internal surface temperature of the adhesive transfer structure includes lowering an internal surface temperature of the adhesive melter feed housing.

3. The method of claim 1, wherein the adhesive transfer structure includes a transfer hose, the method further comprising:
   fluidly coupling the transfer hose between the adhesive melter and the supply container,
   wherein moving the adhesive particulates includes supplying the cooling air through the transfer hose and lowering the internal surface temperature of the adhesive transfer structure includes lowering an internal surface temperature of the transfer hose.

4. The method of claim 3, wherein a suction wand is fluidly coupled to the transfer hose and lowering the internal surface temperature of the transfer hose includes suctioning the cooling air into the transfer hose from within the supply container with the suction wand.

5. The method of claim 1, wherein lowering the internal surface temperature of the adhesive transfer structure includes lowering the internal surface temperature by about 40° F.

6. A hot melt adhesive system, comprising:
   a supply container for storing adhesive particulate;
   an adhesive melter;
   an adhesive transfer structure coupled to the supply container and the adhesive melter for transferring cooling air and adhesive particulate therethrough toward the adhesive melter; and
   a control device configured to actuate transfer of the cooling air from an air source through the adhesive transfer structure to the adhesive melter, and then using the cooling air to transfer the adhesive particulate toward the adhesive melter,
   wherein the adhesive transfer structure defines an internal surface temperature that is configured to be lowered by the cooling air when the cooling air is transferred through the adhesive transfer structure to the adhesive melter.

7. The system of claim 6, wherein the adhesive transfer structure includes an adhesive melter feed housing operatively coupled to the supply container and the adhesive melter.

8. The system of claim 6, wherein the adhesive transfer structure includes a transfer hose operatively coupled to the supply container and the adhesive melter.

9. The system of claim 8, wherein the transfer hose includes an inner surface, the system further comprising:
   a blocking member, the blocking member being movable between a first position in which the stored adhesive particulate is blocked from passing through the transfer hose while the cooling air is permitted to pass through the transfer hose toward the adhesive melter to thereby lower a temperature of the inner surface of the transfer hose and a second position in which the stored adhesive particulate and air are permitted to be withdrawn from the supply container into the transfer hose.

10. A method of supplying adhesive particulates from a supply container to an adhesive melter, the method comprising:
    fluidly coupling an adhesive transfer hose between the adhesive melter and the supply container;
    lowering an internal surface temperature of the adhesive transfer hose by directing cooling air from a pressurized air source through the adhesive transfer hose to the adhesive melter; and
    moving the adhesive particulates from the supply container toward the adhesive melter through the adhesive transfer hose after lowering the internal surface temperature of the adhesive transfer hose.

11. The method of claim 10, wherein a suction wand is fluidly coupled to the transfer hose and lowering the internal surface temperature of the transfer hose includes suctioning the cooling air into the transfer hose from within the supply container with the suction wand.

12. The method of claim 10, wherein lowering the internal surface temperature of the adhesive transfer hose includes lowering the internal surface temperature by about 40° F.

13. A hot melt adhesive system, comprising:
    a supply container for storing adhesive particulate;
    an adhesive melter;
    an adhesive transfer hose coupled to the supply container and the adhesive melter for transferring cooling air and adhesive particulate therethrough toward the adhesive melter; and a control device configured to actuate transfer of the cooling air from an air source through the adhesive transfer hose to the adhesive melter before transferring the adhesive particulate toward the adhesive melter through the adhesive transfer hose, wherein the adhesive transfer structure defines an internal surface temperature that is configured to be lowered by the cooling air when the cooling air is transferred through the adhesive transfer hose to the adhesive melter.

14. The system of claim 13, wherein the transfer hose includes an inner surface, the system further comprising:

a blocking member, the blocking member being movable between a first position in which the stored adhesive particulate is blocked from passing through the transfer hose while the cooling air is permitted to pass through the transfer hose toward the adhesive melter to thereby lower a temperature of the inner surface of the transfer hose and a second position in which the stored adhesive particulate and air are permitted to be withdrawn from the supply container into the transfer hose.

15. The method of claim 1, wherein the pressurized air source includes a venturi pump disposed at the supply container.

16. The system of claim 6, wherein the air source includes a venturi pump disposed at the supply container.

17. The method of claim 10, wherein the pressurized air source includes a venturi pump disposed at the supply container.

18. The system of claim 13, wherein the air source includes a venturi pump disposed at the supply container.

\* \* \* \* \*